United States Patent
Greenwood (10) Patent No.: US 9,248,780 B2
(45) Date of Patent: Feb. 2, 2016

(54) VEHICLE ACCESS APPARATUS AND A METHOD THEREOF

(71) Applicant: LATERAL DESIGN CONCEPTS, LTD, Keighley, West Yorkshire (GB)

(72) Inventor: Stephen Michael Greenwood, Keighley (GB)

(73) Assignee: Lateral Design, Ltd, Keighley (GB)

( * ) Notice: Subject to any disclaimer, the term of this patent is extended or adjusted under 35 U.S.C. 154(b) by 0 days.

(21) Appl. No.: 14/398,006

(22) PCT Filed: May 1, 2013

(86) PCT No.: PCT/GB2013/051123
§ 371 (c)(1),
(2) Date: Oct. 30, 2014

(87) PCT Pub. No.: WO2013/164612
PCT Pub. Date: Nov. 7, 2013

(65) Prior Publication Data
US 2015/0151684 A1  Jun. 4, 2015

(30) Foreign Application Priority Data

May 2, 2012 (GB) .................................. 1207719.4

(51) Int. Cl.
*B60R 3/02* (2006.01)

(52) U.S. Cl.
CPC ............. *B60R 3/02* (2013.01); *Y10T 29/49863* (2015.01)

(58) Field of Classification Search
CPC .................................. B60R 3/02; B60R 3/002
USPC .................................................. 280/163–166
See application file for complete search history.

(56) References Cited

U.S. PATENT DOCUMENTS

| | | | |
|---|---|---|---|
| 5,868,412 A * | 2/1999 | Hinkle | 280/163 |
| 6,375,207 B1 * | 4/2002 | Dean et al. | 280/166 |
| 7,234,716 B2 * | 6/2007 | Stevenson | 280/166 |
| 7,740,261 B2 * | 6/2010 | Leitner et al. | 280/166 |
| 8,002,298 B2 * | 8/2011 | Casbolt et al. | 280/166 |
| 8,011,681 B2 * | 9/2011 | Plavetich | 280/164.1 |
| 2005/0110236 A1 | 5/2005 | Stevenson | |

FOREIGN PATENT DOCUMENTS

DE  10 2010 055 638 A1  6/2012
JP  51-121925 U  10/1976

(Continued)

*Primary Examiner* — John Walters
*Assistant Examiner* — James Triggs
(74) *Attorney, Agent, or Firm* — Stoel Rives LLP (57) ABSTRACT

There is provided an access apparatus having a deployable step that is biased to move towards a stowed position, wherein in the stowed position, the deployable step restricts opening of a vehicle's door. Abutment of a portion of the vehicle's door controls movement of the deployable step. Wherein, when said vehicle door is closed, the deployable step is arranged in a stowed position and when said vehicle door is fully open, the deployable step is arranged in the deployed position to provide a step. Here, when in the deployed position, abutment of the portion of the vehicle's door with the deployable step, prevents the deployable step from moving towards the stowed position. Consequently, and because the deployable step is biased to move towards the stowed position, the deployable step is automatically opened and closed upon opening and closing of the door. Moreover, the automatic opening and closing relies on a simple mechanical relationship, which reduces the chance of a malfunction and allows the access apparatus to be more easily retrofitted.

9 Claims, 10 Drawing Sheets

(56) References Cited

FOREIGN PATENT DOCUMENTS

| | | | |
|---|---|---|---|
| JP | 62-112633 U | 7/1987 | |
| JP | H02-225151 A | 9/1990 | |
| JP | 03-067737 A | 3/1991 | |
| SU | 520281 T | 7/1976 | |

* cited by examiner

VEHICLE ACCESS APPARATUS AND A METHOD THEREOF

CROSS-REFERENCE TO RELATED APPLICATIONS

This application is a national stage application under 35 U.S.C. §371 of International Application No. PCT/GB2013/051123, titled IMPROVEMENTS IN AND RELATING TO VEHICLE ACCESS APPARATUS AND A METHOD THEREOF, filed May 1, 2013, which claims priority to Great Britain Application No. 1207719.4, filed May 2, 2012, which is hereby incorporated by reference in its entirety.

The invention relates to access apparatus for vehicles and the like and in particular, to access apparatus being deployable steps provided on the outside of the vehicle.

Deployable steps are known to be provided on the outside of a vehicle to aid access thereto. For instance, it is known to provide a deployable step on Ambulances, Taxis, and Minibuses, though the application is not limited to these examples. Whilst fixed steps provide adequate access to the vehicle, they can pose a hazard to pedestrians as they permanently extend from the vehicle. Consequently, deployable steps are preferred. That is, it is preferred to provide steps that can be deployed from a stowed position, wherein the step is stored out of the way, and a deployed position, wherein the step provides the access function.

A known deployable step stows the step in the stowed position underneath the vehicle. The step is then slid or pivoted in a horizontal plane to extend from the vehicle and to provide the step. Typically the step may be deployed by activation of a trigger. To prevent the vehicle from being driven without the step being retracted to the stowed position, the trigger is often interlocked with the handbrake. Furthermore, when the step is stowed beneath the vehicle, the ground clearance of the vehicle is reduced and the stowed step can be damaged by road furniture such as speed bumps. Such steps also become prone to degradation through corrosion and dirt ingress through, for example, direct transfer of salts, moisture and dirt from the road surface.

It is an object of the present invention to attempt to overcome at least one of the above or other disadvantages. It is a further aim to provide a vehicle access apparatus wherein a step is deployed and stowed automatically and with reduced need for complex interlocking safety functions. It is a further aim to provide a vehicle access apparatus wherein, when a deployable step is stowed, the vehicle has increased ground clearance, that is the base vehicle's intended ground clearance is not reduced by fitting or retro-fitting a deployable step. It is a further aim to provide a vehicle access apparatus that can be easily retrofitted to an existing vehicle.

According to the present invention there is provided a vehicle access apparatus, a vehicle having said vehicle access apparatus, a method of using said vehicle apparatus, and a method of fitting said vehicle access apparatus to a vehicle as set forth in the appended claims. Other features of the invention will be apparent from the dependent claims, and the description which follows.

According to the exemplary embodiments, there is provided an access apparatus having a deployable step that is biased to move towards a stowed position, wherein in the stowed position, the deployable step restricts opening of a vehicle's door. An abutment portion controls movement of the deployable step. When said vehicle door is closed, the deployable step is arranged in a stowed position and when said vehicle door is fully open, the deployable step is arranged in the a deployed position to provide a step. When in the deployed position, abutment of said portion with the deployable step prevents the deployable step from moving towards the stowed position. Consequently, and because the deployable step is biased to move towards the stowed position, the deployable step is moved between stowed and deployed positions as an automatic consequence of opening and closing the door. Moreover, the automatic opening and closing relies on a simple mechanical relationship, which reduces the chance of a malfunction and allows the access apparatus to be more easily retrofitted.

In the exemplary embodiments, the access apparatus includes a biasing means. The biasing means is arranged to continuously urge the deployable step towards the stowed position. Suitably, the biasing means is a resilient member such as a spring or the like.

In an exemplary embodiment, the deployable step is pivotally attached to the vehicle. Suitably, the deployable step is pivotally attached to fold upwardly against the outside of the vehicle's door. Consequently, the deployable step is stowed substantially above the pivot axis.

In an exemplary embodiment, the portion of the vehicle that abuts the deployable step comprises a cam surface. Depending on the opening characteristics of the vehicle's door, the cam surface moves relative to the deployable step in a first direction and/or a second direction, wherein one direction is parallel to the front-to-back direction of the vehicle, and the other direction is parallel to the side-to-side direction of the vehicle, which is generally orthogonal to the first.

A method of opening the access apparatus consequently comprises opening and closing the vehicle's door. That is, when opening the vehicle's door, the deployable step is caused to move to the deployed position by causing the abutment portion to urge the deployable step to move. When closing the door, the abutment portion is moved to allow movement of the deployable step and because the deployable step is urged to the stowed position, the deployable step moves thereto.

The exemplary embodiments of the access apparatus may be provided with or without the vehicle. That is, it is envisaged that the access apparatus may be provided as a unit for attaching or retrofitting to a vehicle. Here, a portion of the vehicle's door may be utilised as the abutment portion or the access apparatus may include an abutment portion for attachment to the vehicle's door.

A method of fitting the access apparatus therefore comprises moveably attaching the deployable step to a vehicle, wherein the attachment includes arranging a biasing means to bias the deployable step to a closed position wherein opening of the vehicle's door is restricted by abutment between the deployable step and a portion of the vehicle's door.

For a better understanding of the invention, and to show how embodiments of the same may be carried into effect, reference will now be made, by way of example, to the accompanying diagrammatic drawings in which.

Figure 1:
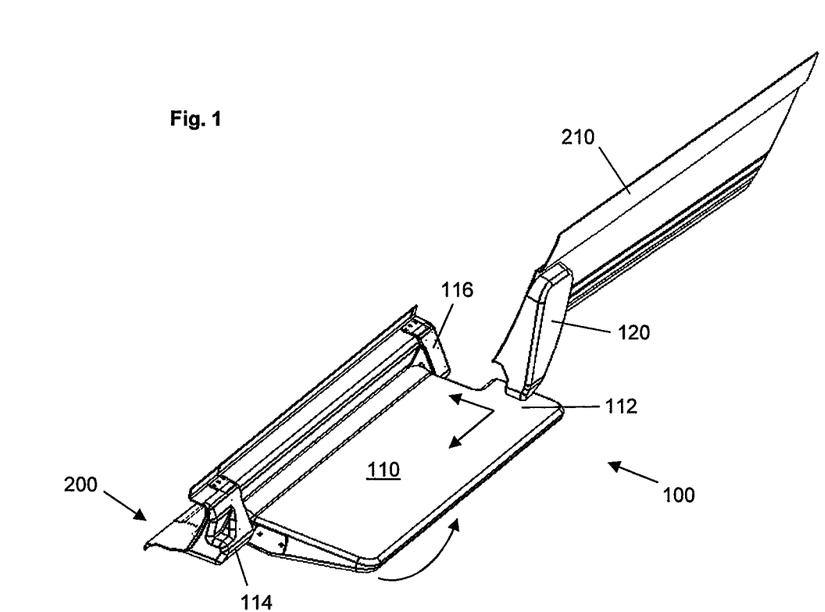
FIGS. 1 to 3 shows pictorial, perspective views of a part of a vehicle having an access apparatus of an exemplary embodiment attached thereto and in a deployed or door open position, intermediate position and stowed or door closed position respectively.
Figure 2:
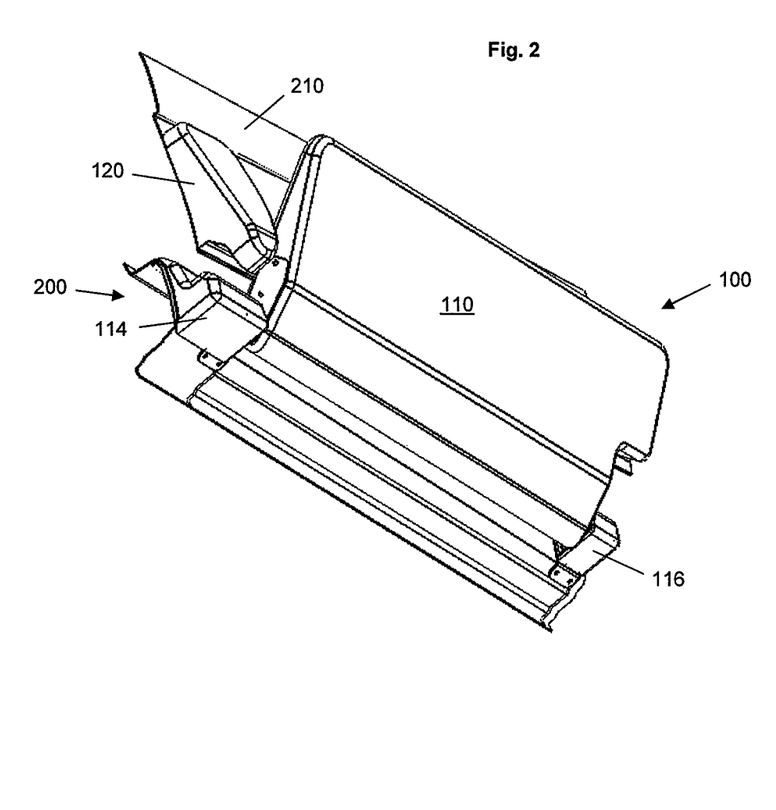
Figure 3:
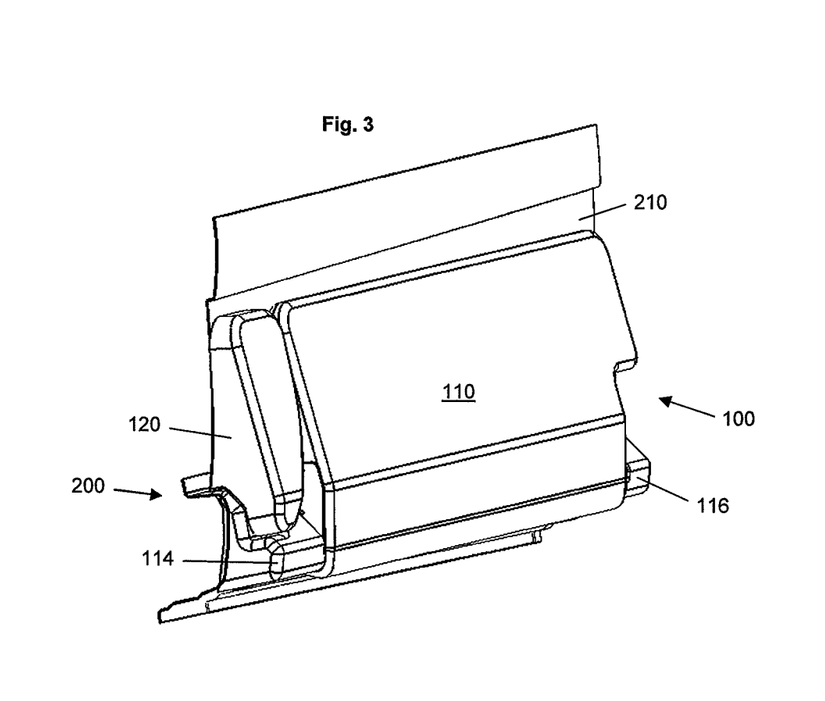

Referring to FIGS. 1 to 3 an exemplary embodiment is described. Here, an access apparatus 100 is provided. The access apparatus 100 is shown attached to a portion of a vehicle 200. The vehicle 200 includes a door 210. The door 210 is moveably attached to a doorway. As will be appreciated, the access apparatus is attached in a vicinity of the door way so as to provide an access step. The door 210 is moveable between an open and closed position. In the closed position, access through the door way is prevented. Herein, the open position refers to a fully open position, being a position wherein the door is typically delimited from moving further. It will be appreciated that a vast number of vehicles are known and a detailed description of the vehicle is not therefore given. Furthermore, whilst the vehicle's door is described herein in relation to a sliding type door, the access apparatus can be adapted for any type of door opening by simple modifications as will be appreciated by the skilled man.

As mentioned, the exemplary embodiments are described, by way of example only, with reference to a sliding door opening. Here, the door opens initially by outwardly movement in a side-to-side direction of the vehicle. This movement allows the door to sit proud of a respective side of the vehicle so that subsequent movement can be substantially sliding movement in a front-to-back direction.

Referring still to FIGS. 1 to 3, the exemplary access apparatus 100 includes a deployable step 110 and an abutment portion 120.

The deployable step is moveably attached to the vehicle 200. The deployable step is attached to the vehicle so that it is moveable from a deployed position, wherein a step is provided. That is, when in the deployed position, the deployable step provides a generally flat upper surface 112 for providing support to a passenger's foot when entering and departing the vehicle. Here, typically the upper surface extends generally from the vehicle and preferably substantially horizontally. It will be appreciated that when in the deployed position, the deployable step and in particular the upper surface 112 provides the same function as related art steps. Consequently, known features of the step may be incorporated. For instance, known safety features such as non-slip features may be included.

The deployable step is moveable from a stowed position. The deployable step protrudes from the vehicle substantially less in the stowed position than in the deployed position. Furthermore, in the stowed position, the deployable step restricts opening of the door. That is, to move the vehicle door to the open position, the abutment portion must act on the deployable step to move the deployable step to the deployed position.

The abutment portion 120 is fixed fast to the door 210. It will be appreciated that although the abutment portion 120 may be a separate part to the door so that it is easily retrofitted, the abutment portion 120 may also be integral to the door 210. As mentioned, the abutment portion is arranged to abut the deployable step when opening the door. Furthermore, the abutment portion is arranged to abut the deployable step when the door is open. Here, abutment between the deployable step and the abutment portion prevents the deployable step from moving back towards the stowed position. Suitably, once the abutment portion initially abuts the deployable step, the abutment portion continuously prevents the deployable step from moving back towards the stowed position without moving the door to the closed position.

In the exemplary embodiments, a biasing means such as a bias member is provided. The bias member is arranged to act on the deployable step to urge the deployable step to move towards the stowed position. Consequently, the deployable step automatically moves to the stowed position when the door is closed. Suitably, the bias member may be a resilient member such as a spring or the like.

Figure 4:
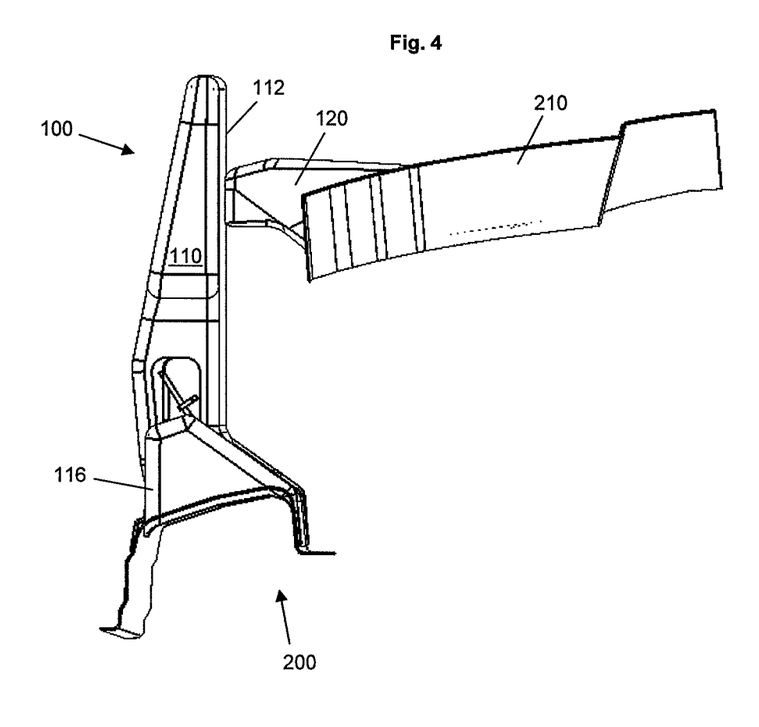
FIGS. 4 to 6 are rear elevation views of FIGS. 1 to 3 respectively.
Figure 5:
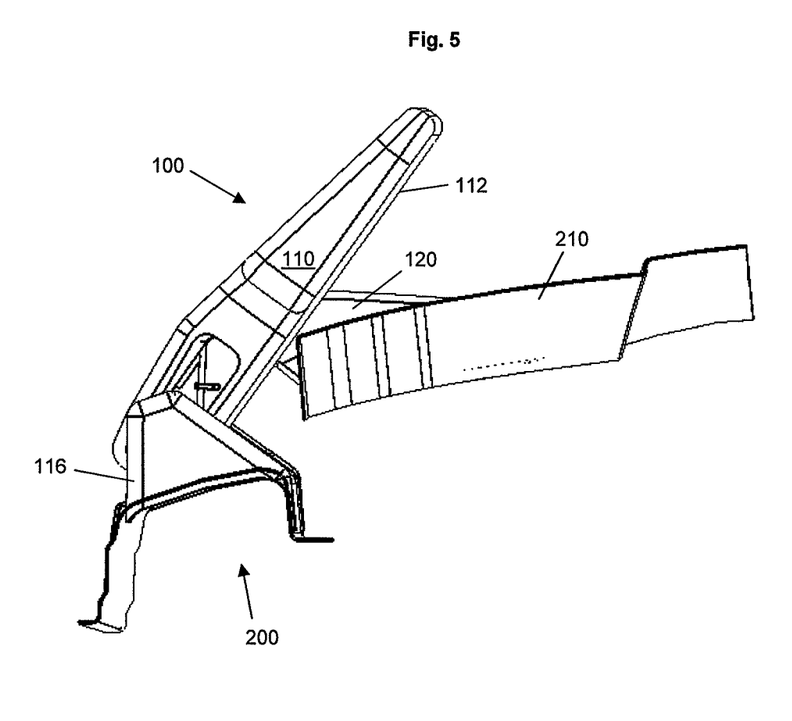
Figure 6:
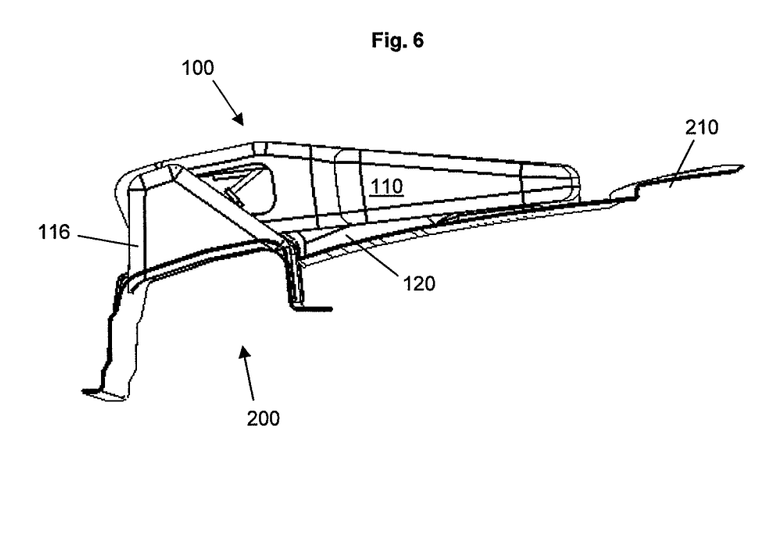

As shown in FIGS. 4 to 6, suitably, in a particular exemplary embodiment, the deployable step is pivotally moveable between the stowed and deployed positions. Here, the deployable step 110 is attached to the vehicle about a pivot axis. The pivot axis is suitably arranged parallel to a side of the vehicle and substantially horizontally, relative to the vehicle. The pivot axis is arranged dependant on the requirements of the step, however, as shown in the figures, the deployable step may be stowed to overlap the doorway. In one embodiment and referring briefly back to FIG. 2, the deployable step is attached to a pivot at the front and back ends, wherein the front and back refers to the direction of the vehicle when applied to a side mounted door. Here, pivot assemblies 114, 116 may be provided. The pivot assemblies are arranged to pivotally receive the deployable step. The pivot assemblies may be connectable to the vehicle so as to provide an easy retrofitting of the access apparatus. However, it will be appreciated that the pivot assemblies may also be more integrally provided with the vehicle. Again, a detailed description of a pivotal connection is not given as such pivotal connections are well known.

Figure 7:
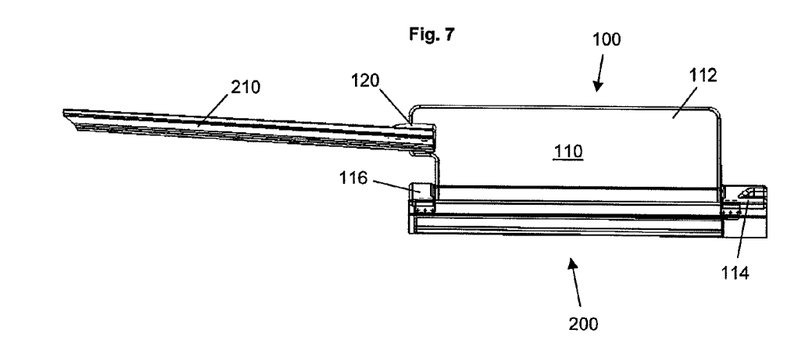
FIGS. 7 and 8 are top elevation views of FIGS. 1 and 2 respectively.
Figure 8:
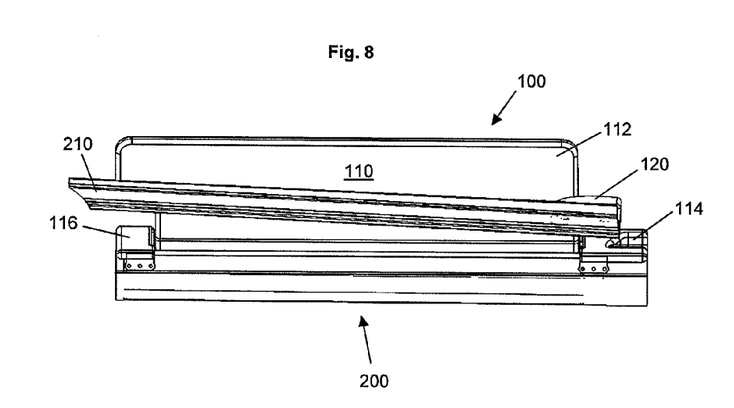

When pivotally arranged, the abutment member suitably abuts the upper surface 112 of the deployable step 110. As shown in FIGS. 7 and 8, the abutment member 120 traces a path over the upper surface 112. For instance, the abutment portion moves in a front-to-back direction relative to the deployable step as well as a side-to-side direction. Since the abutment member (described in more detail below) may have a number of formations, it will be appreciated that the upper surface 112 may be adapted to provide smooth movement of the abutment portion relative to the deployable step. Moreover, the abutment portion may rest on the deployable step. That is, an external force may be able to urge the deployable step towards the deployed position, against the bias and to separate the upper surface and abutment member. Alternatively, the abutment portion may be interlocked such that the abutment portion also abuts the deployable step when an external force attempts to urge the deployable step towards the deployed position.

Suitably, a stop may be provided to prevent further movement of the deployable step when in the deployed position. That is, the stop may prevent the deployable step from continuing to move away from the stowed position. Specifically, when the deployable step is pivotally attached, the stop prevents downwards rotation of the deployable step and therefore provides support to the step when being used. Preferably, the stop is a mechanical stop, such as abutment between an end of the deployable step and vehicle.

Figure 9:
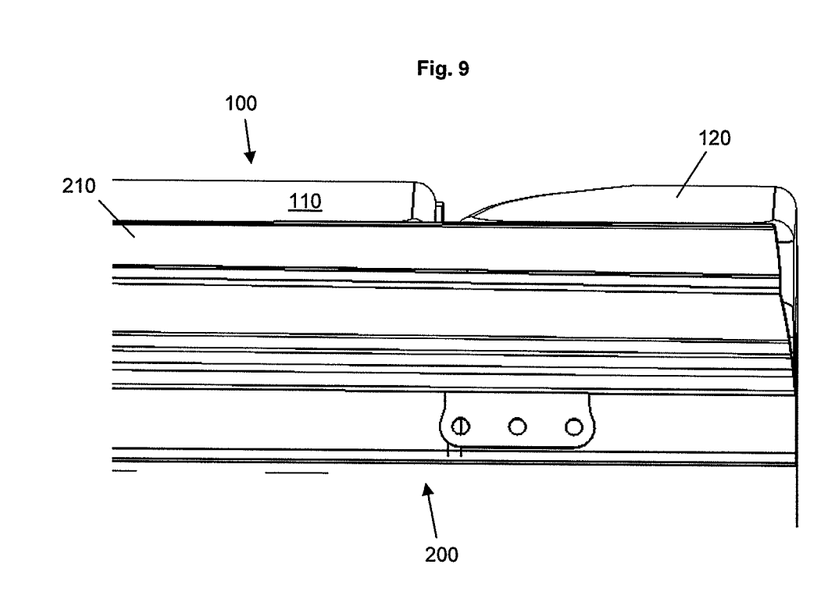
FIG. 9 is a top elevation view of one exemplary embodiment of the access apparatus in a stowed or door closed position.

Referring to FIG. 9, whilst the abutment portion may be arranged to be in continuous contact with the deployable step 110, the abutment portion may be arranged to not be in contact with the deployable step when the door is in the closed position. Thus, the door moves freely, at least initially towards the open position before further opening causes abutment. Here, as shown in FIG. 9, the abutment portion and deployable step may be arranged to include a wedge interface there between.

Figure 10:
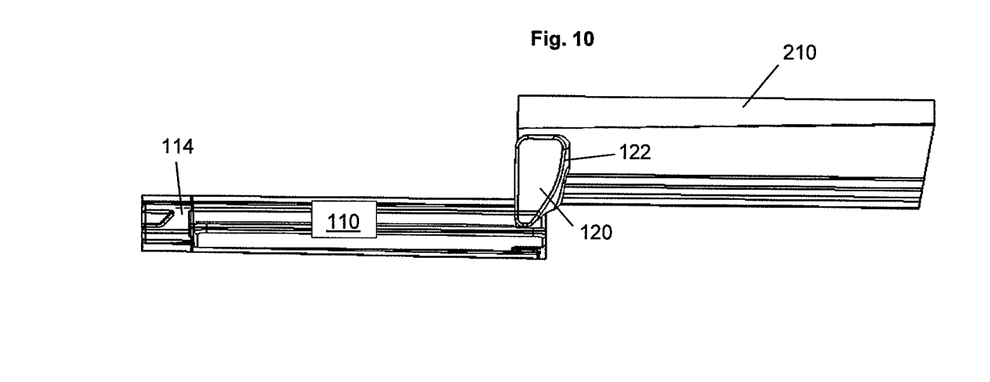
FIGS. 10 to 12 are side elevation views of FIGS. 1 to 3 respectively.
Figure 11:
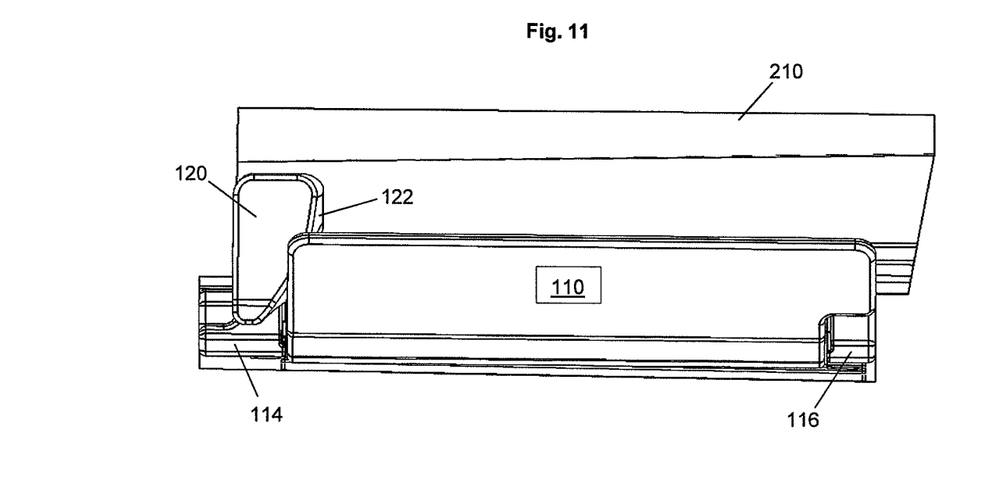
Figure 12:
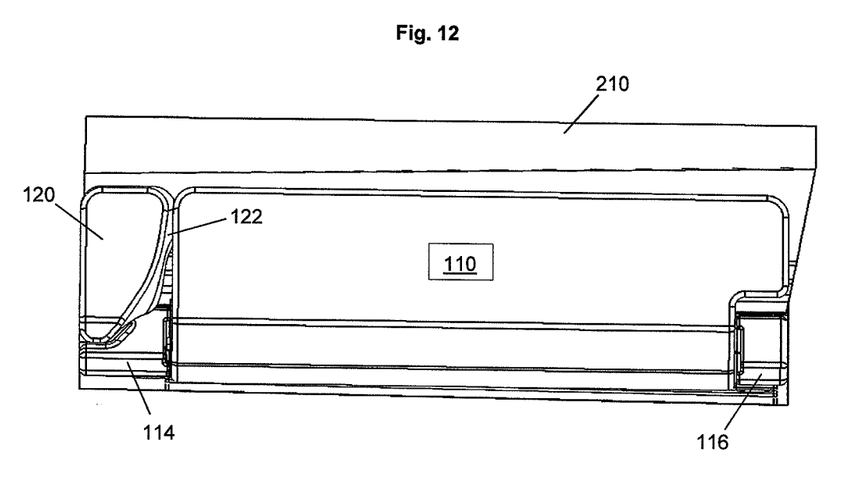

Referring to FIGS. 10 to 12, the abutment portion 120 suitably comprises a cam follower. The cam follower may be any suitable means such as a wheel, roller or bearing surface. However, in the exemplary embodiments the cam follower is suitably shown as a cam surface 122. Here, the cam surface 122 is shaped so as to contact and move the deployable step in a controlled and smooth manner. Consequently, it will be appreciated that as long as the deployable step is biased to the stowed position wherein the abutment portion is arranged such that to open the door it must abut the deployable step, the cam surface can be arranged to suit any type of door opening and so as to move the deployable step to the open position during the movement of the door to the open position.

As shown in the Figures whilst the deployable step 110 may be any suitable shape and size, typically, the deployable step is elongate in the front-to-back direction. Furthermore, whilst the deployable step is shown as being suitable for providing access to a single doorway, the deployable step may span two or more doors. Here, opening any one of the doors causes the deployable step to move to the deployed position.

The exemplary embodiments described herein provide an access apparatus wherein a deployable step is automatically moved between the deployed and stowed positions upon opening and closing a door. Furthermore, because in an exemplary embodiment, the deployable step is rotated upwardly to the stowed position, the access apparatus does not substantially restrict the clearance height of the vehicle as compared to an under slung related art apparatus.

Although a few preferred embodiments have been shown and described, it will be appreciated by those skilled in the art that various changes and modifications might be made without departing from the scope of the invention, as defined in the appended claims.

The invention claimed is:

1. A vehicle comprising:
   a door which is mounted for sliding movement between a closed position and an open position; and
   an access apparatus comprising:
      an abutment portion arranged to be fast with the door of the vehicle;
      a deployable step that is pivotally mounted to the vehicle for movement between a stowed position and a deployed position by rotating about a pivot axis, the step moving from the deployed position to the stowed position by rotating upwardly, wherein in the stowed position, the deployable step restricts movement of the door; and
      a bias member arranged to urge the deployable step towards the stowed position;
   wherein:
      the abutment portion and the deployable step are arranged so that opening the door causes the abutment portion to abut the deployable step to move the deployable step to the deployed position against the bias member;
      the abutment portion comprises a cam surface which is shaped to contact and move the step;
      the abutment portion is arranged to abut the deployable step when the door is open, to prevent the step from moving back to the stowed position; and
      the bias member is arranged to continuously urge the deployable step towards the stowed position, so that the deployable step automatically returns to the stowed position when the door is closed.

2. The vehicle of claim 1, wherein the abutment portion is formed integrally with the door of the vehicle.

3. The vehicle of claim 1, wherein the abutment portion is formed separately to the door of the vehicle and attached thereto.

4. An access apparatus adapted to be fixed to an external portion of a vehicle, the access apparatus comprising:
   an abutment portion which can be attached to a door of the vehicle;
   a deployable step that can be pivotally mounted to the vehicle for movement between a stowed position and a deployed position by rotating about a pivot axis, the step moving from the deployed position to the stowed position by rotating upwardly, wherein in the stowed position, the deployable step restricts movement of the door; and
   a bias member arranged to urge the deployable step towards the stowed position; wherein:
   the abutment portion and the deployable step can be arranged so that opening the door causes the abutment portion to abut the generally flat upper surface of the deployable step to move the deployable step to the deployed position against the bias member; and
   the abutment portion comprises a cam surface which is shaped to contact and move the step;
   the abutment portion can be arranged to abut the deployable step when the door is open, to prevent the step from moving back to the stowed position; and
   the bias member is arranged to continuously urge the deployable step towards the stowed position, so that the deployable step automatically returns to the stowed position when the door is closed.

5. The access apparatus of claim 4, wherein the access apparatus includes at least one pivot assembly that can be secured fast to the vehicle, the deployable step being mounted to the pivot assembly so as to rotate relative thereto.

6. A method of fitting an access apparatus to a vehicle, wherein the access apparatus is as claimed in claim 4, the method comprising:
   fixing the deployable step to the vehicle so that it is moveable between the stowed position and the deployed position; and
   arranging the bias member to urge the deployable step to move towards the stowed position.

7. A method of using the access apparatus as claimed in claim 4, the method comprising:
   moving a door of a vehicle between a closed position and an open position and consequently causing the deployable step to move between the stowed position and the deployed position; and
   moving the door of the vehicle between the open position and the closed position and consequently causing the deployable step to move between the deployed position and the stowed position.

8. The vehicle of claim 1, in which the abutment portion is arranged to be in continuous contact with the deployable step.

9. The vehicle of claim 1, in which the abutment portion is arranged so that, when the door is in the closed position, the abutment portion does not contact the deployable step.

* * * * *